A. SMITH & C. SOUTHALL.
WEIGHING MACHINE.
APPLICATION FILED MAY 11, 1912.

1,059,226.

Patented Apr. 15, 1913.
3 SHEETS—SHEET 1.

WITNESSES
Sidney Brooks
J. P. Davis

INVENTORS
Arthur Smith
Christopher Southall
BY
Munn & Co
ATTORNEYS

A. SMITH & C. SOUTHALL.
WEIGHING MACHINE.
APPLICATION FILED MAY 11, 1912.

1,059,226.

Patented Apr. 15, 1913.
3 SHEETS—SHEET 2.

WITNESSES

INVENTORS
Arthur Smith
Christopher Southall
BY
ATTORNEYS

UNITED STATES PATENT OFFICE.

ARTHUR SMITH AND CHRISTOPHER SOUTHALL, OF BIRMINGHAM, ENGLAND.

WEIGHING-MACHINE.

1,059,226.      Specification of Letters Patent.      Patented Apr. 15, 1913.

Application filed May 11, 1912. Serial No. 696,732.

*To all whom it may concern:*

Be it known that we, ARTHUR SMITH and CHRISTOPHER SOUTHALL, subjects of the King of Great Britain, residing at Villa Street Works, in the city of Birmingham, England, engineers, have invented certain new and useful Improvements Relating to Weighing-Machines, of which the following is a specification.

This invention relates to machines for weighing tea, coffee, cocoa, flour, wheat, maize, seeds and other granular, pulverulent, powdered and like materials, the object of the invention being to provide improved mechanical means for controlling the operations of the sluices, valves, cut-offs or the like.

Figure 1:
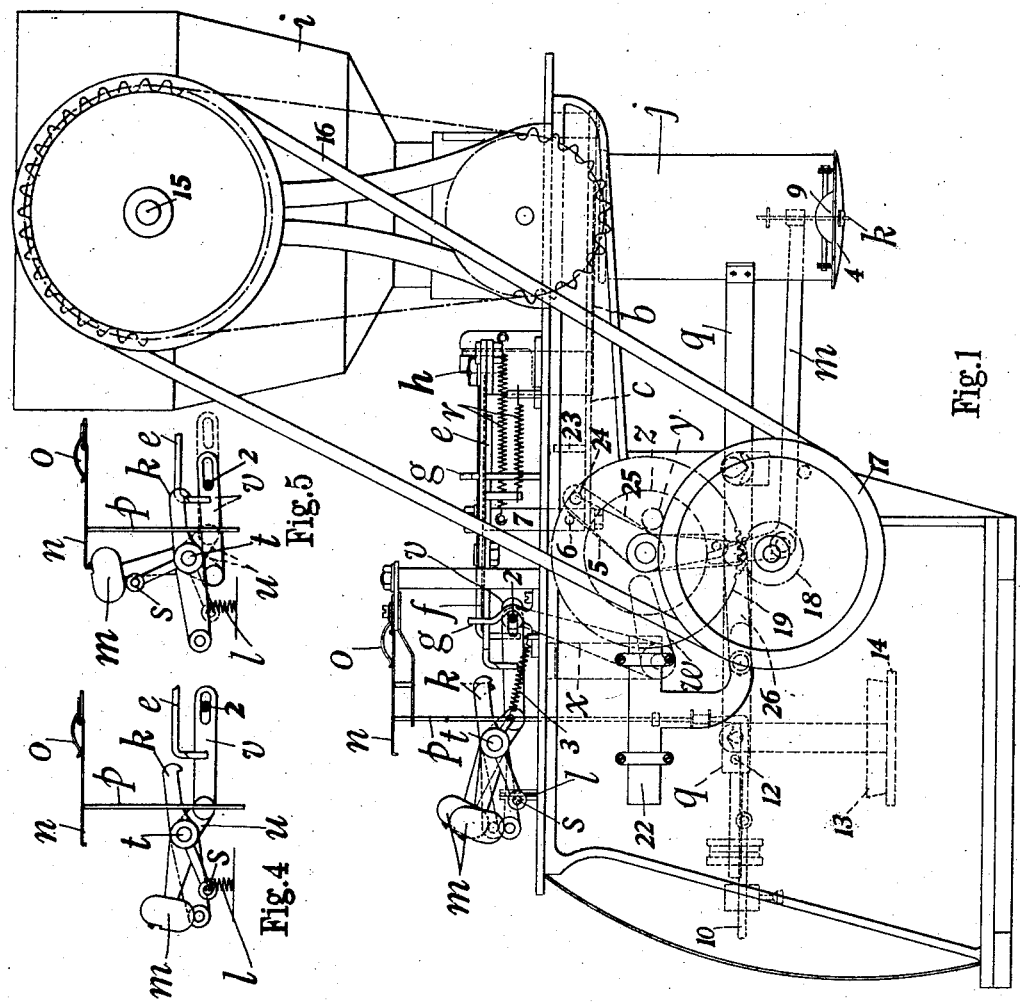
Figure 2:
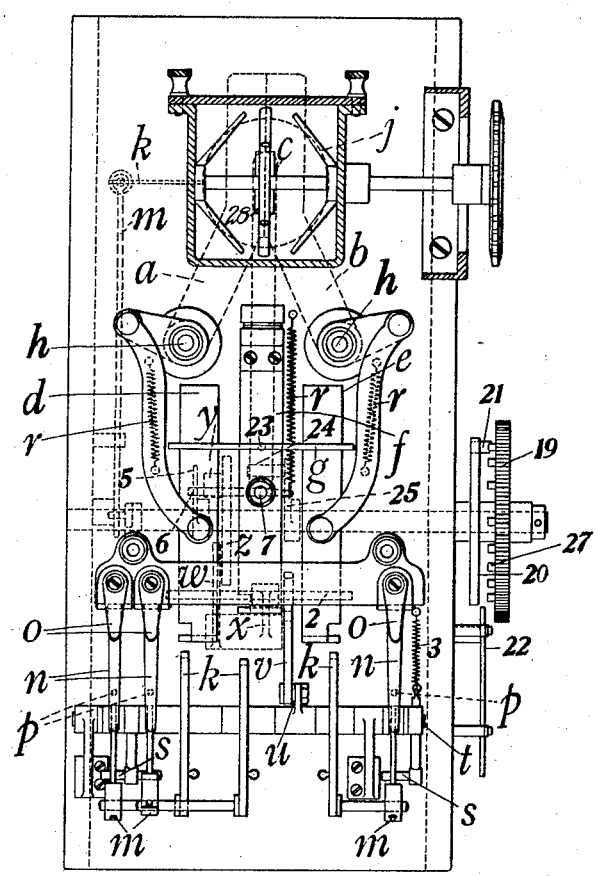
Figure 3:
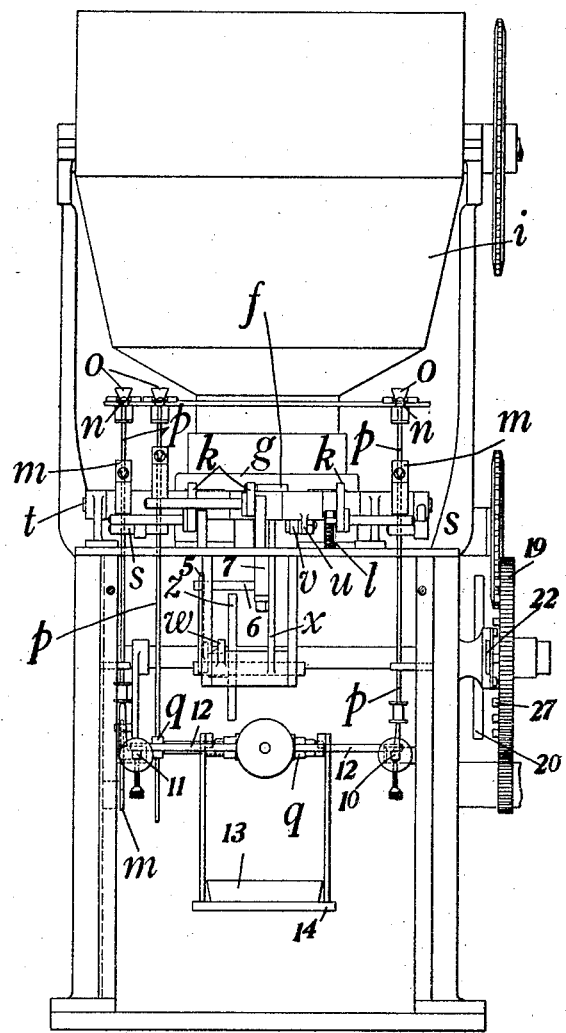

Referring to the three accompanying sheets of explanatory drawings:—Figure 1 is a side elevation, Fig. 2 a plan and Fig. 3 an end view of a weighing machine having this invention applied thereto. Figs. 4 and 5 are detail views respectively showing one of the catch and trip mechanisms in the inoperative and operative positions.

The same reference letters in the different views indicate the same or similar parts.

In carrying the invention into effect, the various sluices, valves or cut-offs $a$, $b$ and $c$ are operated from sliding bars $d$, $e$ and $f$ mounted in guides $g$ on the upper side of the machine. The cut-offs $a$ and $b$ oscillate about the pivots $h$, whereas the cut-off $c$ operates with a rectilinear motion. The cut-offs are arranged to control an aperture 28 (Fig. 2) through which the material to be weighed passes from the hopper $i$ to the weigh pan $j$. The arrangement of the cut-offs which is a well known one and forms no part of this invention, will be identified by the following description:—The cut-offs $a$ and $b$ cover a single aperture or a pair of apertures when they lie close together side by side as shown in Fig. 2, excepting a small opening which is formed by gaps in the adjacent edges of the cut-offs themselves, this opening being closed by the third cut-off $c$. When all the cut-offs are moved to the inoperative position, a full out-flow is permitted from the hopper. On closing one of the cut-offs, the outlet aperture is reduced and a further reduction occurs when the second cut-off is closed. The remaining aperture is that through the two before-mentioned cut-offs and this is closed by the third cut-off $c$.

Each cut-off operating bar has pivoted adjacent to it a catch piece $k$ controlled by a spring $l$ which causes the catch to engage the bar, and co-axially with the catch piece is pivoted a hammer-like trip $m$ which is secured in the elevated or inoperative position by a catch $n$ comprising a hinged steel blade adapted to engage the trip under the action of a spring $o$ as shown in Fig. 5. In conjunction with such catch is mounted a lifting rod $p$ which is operated from the weigh beam $q$ as hereinafter described. When the weigh beam is moved sufficiently, under the action of the material falling into the weigh pan, the lifting rod raises the catch $n$ and releases the trip piece, thereby allowing the latter to fall on to the catch $k$. By disengaging the said catch $k$ the slide and cut-off are permitted to be closed under the action of a spring $r$. A similar arrangement is employed with each sluice. Return of the trips to the initial position after each complete cycle of operations of the machine is effected by levers $s$ secured to the shaft $t$ on which the trips and hammers are loosely mounted, the said levers being operated through another lever $u$ on the shaft from a common bar $v$ which is actuated from any convenient part of the machine. In the form shown in the drawings the bar has the required motion imparted to it from levers $w$ and $x$ actuated by a projection $y$ on a rotating disk $z$, the connection between the lever $x$ and the bar $v$ being effected by a pin 2 which enters a slot in the bar as illustrated in Fig. 1. The same pin by its abutment against the downwardly turned ends of the bars $d$, $e$ and $f$ imparts a longitudinal motion to such bars and causes the sluices to be opened. Return of the levers $s$ after the trips have been raised and the levers $w$ and $x$ withdrawn to the original position is effected by a spring 3.

For liberating the hinged door 4 at the underside of the weigh pan $i$, when the required mass of material has been introduced into the pan the following mechanism is employed: Referring to Fig. 1 the door 4 is held in the closed position by a catch $k$. Adjacent to the catch is pivoted a hammer trip $m$ and the latter is actuated for liberating the catch from the door by a lever 5 and projection 6 on the part 7 connecting the bar $f$ and sluice $c$. When the sluice $c$ closes the projection strikes the lever 5 and thereby imparts the required motion to the trip $m$ for disengaging the catch. The catch reëngages the door under the action of a spring 8 when the door is returned to its closed position by a weight 9 after the material has been discharged from the pan.

Actuation of the rods $p$ from the weigh beam $q$ is effected as follows: Adjacent to the end of the weigh beam remote from the pan are pivoted a pair of auxiliary counterweighted beams 10 and 11 each of which is adapted to lift the particular rod $p$ arranged with it. The said beams are also adapted to act through projections 12 on the main beam $q$ and thereby counteract or neutralize to a slight extent the principal weight 13 placed on the weigh pan 14 of the machine. The main beam $q$ has also a rod $p$ directly connected to it. When the mass of material delivered into the weigh pan approaches the proper weight the end of the weigh beam carrying the pan drops slightly and in consequence the other end rises, thereby permitting the end of one of the auxiliary beams (say 10) to rise and lift the rod $p$ associated with it. The catch controlled by this rod is thus released and the corresponding cut-off permitted to close under the action of its spring. The auxiliary beam in this operation reaches the limit of its movement and has no further effect upon the main beam. After a little more material has been fed into the weigh pan a further movement of the beam occurs and a like operation is performed by the other auxiliary beam (11) and its rod $p$ and catch $k$, with the result that another cut-off is closed. The weigh beam is now acted upon entirely by the weight in the weigh pan and when the full weight of material has been fed into the pan the beam again moves and by lifting the third rod $p$ secured to it causes the last cut-off to be closed, thereby completely intercepting the flow of material from the hopper to the pan. When the weighed material has been discharged from the pan the beam returns to its initial position under the action of the weight on its weigh pan, and the auxiliary beams and rods are likewise restored to the initial positions in readiness for repetition of the cycle of operations.

The machine is actuated automatically by a belt from a driving shaft 15, belt 16 and pulley 17 acting through gear wheels 18 and 19 on a clutch 20. Such clutch receives its motion from the wheel 19 through a pawl 21 which can be put out of action by a sliding bar 22. When the cut-offs have all been opened by the action of the projections $y$ on the levers $w$ and $x$, a projection 23 on the cut-off $c$ operates on a projection 24 of a lever 25 and causes the sliding bar 22 through the bar 26 to disengage the pawl 21 from the projections 27 on the wheel 19, so that no further rotation of the disk $z$ can occur. But when the cut-off $c$ closes the part 7 on the said cut-off strikes the projection 24 on the lever 25 and causes the bar 22 to liberate the pawl 21, whereupon the clutch 20 is once more connected to the wheel 19 and the cut-offs are again opened for the delivery of another quantity of material from the hopper to the weigh pan.

The automatic driving mechanism above described and the auxiliary beams acting on the weigh beam form no part of this invention, but are included in this description to make clear the action of the novel parts of the machine.

The invention is not limited to the type of machines herein described as it may be applied to other machines of a like nature in which the flow of material into the hopper is controlled by cut-offs or their equivalent.

Having thus described our invention what we claim as new and desire to secure by Letters Patent is:—

1. In weighing machines for weighing tea, coffee, cocoa, flour, wheat, maize, seeds and other granular, pulverulent, powdered and similar materials, the combination with a cut-off and weigh beam, of a catch adapted to retain the cut-off in the open position, a hinged hammer-like trip for disengaging the catch from the cut-off, retaining means whereby the trip is held in the inoperative position, releasing means actuated with the movement of the beam for liberating the trip, and an automatic trip raising device, substantially as described.

2. In weighing machines for weighing tea, coffee, cocoa, flour, wheat, maize, seeds and other granular, pulverulent, powdered and similar materials, the combination with a cut-off and weigh beam, of a catch adapted to retain the cut-off in the open position, a hinged hammer-like trip for disengaging the catch from the cut-off, retaining means whereby the trip is held in the inoperative position, an auxiliary beam in conjunction with the main beam, and releasing means actuated with the movement of the said auxiliary beam for liberating the trip, substantially as described.

3. In weighing machines for weighing tea, coffee, cocoa, flour, wheat, maize, seeds and other granular, pulverulent, powdered and similar materials, the combination with a cut-off and weigh beam, of a catch adapted to retain the cut-off in the open position, a hinged hammer-like trip for disengaging the catch from the cut-off, a hinged catch whereby the trip is held in the inoperative position, and a push rod actuated with the movement of the beam for releasing the trip retaining catch, substantially as described.

4. In weighing machines for weighing tea, coffee, cocoa, flour, wheat, maize, seeds and other granular, pulverulent, powdered and similar materials, the combination with a cut-off and weigh beam, of a catch adapted to retain the cut-off in the open position, a hinged hammer-like trip for disengaging the catch from the cut-off, a hinged catch whereby the trip is held in the inoperative position, a push rod actuated with the movement of the beam for releasing the trip retaining catch, a trip raising lever, sluice opening means, and a bar connecting said means to the trip raising lever, substantially as described.

5. In weighing machines for weighing tea, coffee, cocoa, flour, wheat, maize, seeds and other granular, pulverulent, powdered and similar materials, the combination with a cut-off and weigh beam, of a catch adapted to retain the cut-off in the open position, a hinged hammer-like trip for disengaging the catch from the cut-off, a hinged catch whereby the trip is held in the inoperative position, a push rod actuated with the movement of the beam for releasing the trip retaining catch, a trip raising lever, cut-off opening means, a bar connecting said means to the trip raising lever, and springs in conjunction with the trip retaining catch and the trip raising lever, substantially as described.

In testimony whereof we have signed our names to this specification in the presence of two subscribing witnesses.

ARTHUR SMITH.
CHRISTOPHER SOUTHALL.

Witnesses:
JOHN MORGAN,
FRANCIS MALPAS.

Copies of this patent may be obtained for five cents each, by addressing the "Commissioner of Patents, Washington, D. C."